United States Patent
Nakata

(10) Patent No.: US 11,270,228 B2
(45) Date of Patent: Mar. 8, 2022

(54) INFORMATION PROCESSING METHOD AND INFORMATION PROCESSING SYSTEM

(71) Applicant: Panasonic Intellectual Property Management Co., Ltd., Osaka (JP)

(72) Inventor: Yohei Nakata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 688 days.

(21) Appl. No.: 16/168,664

(22) Filed: Oct. 23, 2018

(65) Prior Publication Data

US 2019/0156249 A1    May 23, 2019

(30) Foreign Application Priority Data

Nov. 17, 2017  (JP) ............................ JP2017-221690
Jun. 11, 2018  (JP) ............................ JP2018-111074

(51) Int. Cl.
   *G06N 20/00*   (2019.01)
   *G06N 3/04*    (2006.01)
   (Continued)

(52) U.S. Cl.
   CPC ......... *G06N 20/00* (2019.01); *G06F 9/44505* (2013.01); *G06N 3/0454* (2013.01); *G06N 3/063* (2013.01); *G06N 3/082* (2013.01)

(58) Field of Classification Search
   CPC ...... G06N 20/00; G06N 3/0454; G06N 3/082; G06N 3/063; G06F 9/44505
   See application file for complete search history.

(56) References Cited

U.S. PATENT DOCUMENTS

| 11,004,118 B1* | 5/2021 | Chitilian | G06Q 30/0277 |
| 2005/0071301 A1* | 3/2005 | Kuroiwa | G06N 20/00 706/12 |

(Continued)

FOREIGN PATENT DOCUMENTS

| JP | 2017-097807 | 6/2017 |
| WO | 2017/187798 A1 | 11/2017 |

OTHER PUBLICATIONS

Sze V., (Nov. 16, 2017) "Designing Hardware for Machine Learning" Retreieved from https://ieeexplore.ieee.org/abstract/document/8110880 (Year: 2017).*

(Continued)

*Primary Examiner* — Eric Nilsson
(74) *Attorney, Agent, or Firm* — Greenblum & Bernstein, P.L.C.

(57) ABSTRACT

An information processing method includes: deciding a configuration of a machine learning model, using a processor; performing first determination as to whether the machine learning model in the decided configuration meets a first performance requirement on hardware performance; performing learning using the machine learning model in the configuration determined to meet the first performance requirement, performing second determination as to whether a learned model obtained by the learning meets a second performance requirement on evaluation value of output of a machine learning model, and when the learned model is determined to meet the second performance requirement, outputting information indicating that both performance requirements are met; and when it is determined that the first performance requirement is not met, changing the configuration of the machine learning model, and performing the first determination as to whether the machine learning model (Continued)

in the changed configuration meets the first performance requirement.

13 Claims, 6 Drawing Sheets

(51) Int. Cl.
*G06N 3/08* (2006.01)
*G06N 3/063* (2006.01)
*G06F 9/445* (2018.01)

(56) References Cited

U.S. PATENT DOCUMENTS

2016/0328647 A1   11/2016  Lin et al.
2017/0154260 A1    6/2017  Hamada et al.
2019/0057309 A1*  2/2019  Oobuchi ................ G06N 3/086

OTHER PUBLICATIONS

The Extended European Search Report dated Mar. 25, 2019 for European Patent Application No. 18202280.6.

\* cited by examiner

INFORMATION PROCESSING METHOD AND INFORMATION PROCESSING SYSTEM

BACKGROUND

1. Technical Field

The present disclosure relates to an information processing method and an information processing system that decides a machine learning model used for machine learning.

2. Description of the Related Art

Japanese Unexamined Patent Application Publication No. 2017-97807 discloses a learning method in which in learning using a neural network, processing to change the number of units in a neural network is performed and the learning is stopped by using a genetic algorithm.

SUMMARY

In one general aspect, the techniques disclosed here feature an information processing method including: deciding a configuration of a machine learning model, using a processor; performing first determination using the processor as to whether the machine learning model in the decided configuration meets a first performance requirement which is a requirement on hardware performance; when it is determined that the first performance requirement is met in the first determination, performing learning using the processor and the machine learning model in the configuration determined to meet the first performance requirement, performing second determination using the processor as to whether a learned model obtained by the learning meets a second performance requirement which is a requirement on evaluation value of output of a machine learning model, and when the learned model is determined to meet the second performance requirement in the second determination, outputting information using the processor, the information indicating that the first performance requirement and the second performance requirement are met; and when it is determined that the first performance requirement is not met in the first determination, changing the configuration of the machine learning model using the processor, and performing the first determination as to whether the machine learning model in the changed configuration meets the first performance requirement.

It should be noted that general or specific embodiments may be implemented as a system, a device, an integrated circuit, a computer program, a storage medium such as a computer-readable CD-ROM, or any selective combination thereof.

An information processing method according to the present disclosure is capable of efficiently deciding a machine learning model that meets requested hardware performance requirements.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
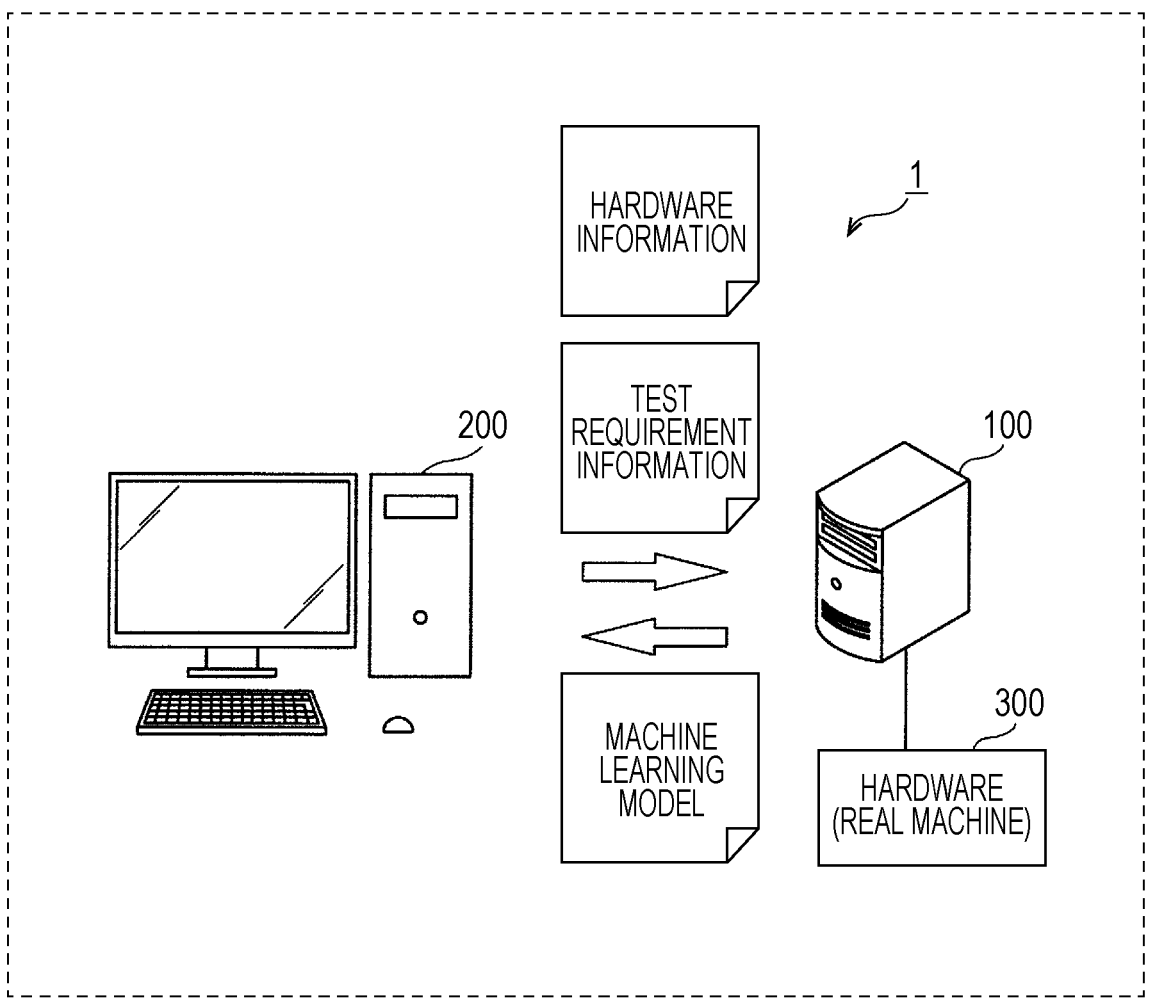
FIG. 1 is a diagram for explaining the outline of an information processing system according to an embodiment.

DETAILED DESCRIPTION (Underlying Knowledge Forming Basis of the Present Disclosure)

The present inventor has found that the following problems occur in the learning method described in "Description of the Related Art".

In recent years, in order to secure the safety of advanced driver assistance system (ADAS) and an automatic operating system, processing using machine learning such as deep learning needs to be applied to an in-vehicle system. Also, in order to utilize as an in-vehicle electronic control unit (ECU), a processor that performs processing using such machine learning is required to meet stringent constraints on power consumption, processing speed, and recognition accuracy.

However, processors having many different features are used for in-vehicle ECUs according to vehicle types, grades of automobile. For this reason, a problem arises in that it is difficult to efficiently decide a machine learning model that meets the above-mentioned constraints for different processors.

In other words, in Japanese Unexamined Patent Application Publication No. 2017-97807, the performance of hardware utilizing a machine learning result is not taken into consideration, and thus it is difficult to efficiently decide a machine learning model that meets the performance requirements on the hardware.

The present disclosure provides an information processing method and an information processing system that are capable of efficiently decide a machine learning model that meets requested hardware performance requirements.

A information processing method according to an aspect of the present disclosure is an information processing method including: deciding a configuration of a machine learning model, using a processor; performing first determination using the processor as to whether the machine learning model in the decided configuration meets a first performance requirement which is a requirement on hardware performance; when it is determined that the first performance requirement is met in the first determination, performing learning using the processor and the machine learning model in the configuration determined to meet the first performance requirement, performing second determination using the processor as to whether a learned model obtained by the learning meets a second performance requirement which is a requirement on evaluation value of output of a machine learning model, and when the learned model is determined to meet the second performance requirement in the second determination, outputting information using the processor, the information indicating that the first performance requirement and the second performance requirement are met; and when it is determined that the first performance requirement is not met in the first determination, changing the configuration of the machine learning model using the processor, and performing the first determination as to whether the machine learning model in the changed configuration meets the first performance requirement.

According to this, the configuration of a machine learning model is changed without performing the second determination until the first performance requirement is met in the first determination, and thus it is possible to reduce the number of times of performing the second determination. Therefore, it is possible to efficiently decide a machine learning model that meets requested hardware performance requirements. In addition, it is possible to reduce the processing load and consumption energy of processors.

Preferably, in the information processing method of the present disclosure, when it is determined that the second performance requirement is not met in the second determination, the learning is performed using a parameter different from a parameter used in the previously performed learning, the second determination is performed as to whether a learned model obtained by the learning using the different parameter meets the second performance requirement, when a number of determinations, in which it is determined that the second performance requirement is not met, is greater than or equal to a first number, the configuration of the machine learning model is changed, and the first determination is performed as to whether the machine learning model in the changed configuration meets the first performance requirement.

According to this, when it is determined the first number of times or more that the second performance requirement is not met, the configuration of the machine learning model is changed, and thus the number of times of learning can be reduced. Therefore, it is possible to efficiently decide a machine learning model.

Preferably, in the information processing method of the present disclosure, weight reduction processing is further performed on the learned model determined to meet the second performance requirement in the second determination, third determination is performed as to whether a weight reduction model obtained by the weight reduction processing meets a third performance requirement which is a requirement on hardware performance, and when it is determined that the third performance requirement is met in the third determination, information indicating that the third performance requirement is met is output.

According to this, the configuration of the machine learning model is changed without performing the second determination, the weight reduction processing, and the third determination until the first performance requirement is met in the first determination. Therefore, it is possible to reduce the number of times of performing the second determination, the weight reduction processing, and the third determination.

Preferably, in the information processing method of the present disclosure, a condition for hardware performance, specified in the third performance requirement is more stringent than a condition for hardware performance, specified in the first performance requirement.

Therefore, it is possible to reduce the number of times of decision that the first performance requirement is not met, decision of the configuration of the machine learning model, and performing the first determination. Also, more stringent determination is performed in the third determination, thereby making it possible to reduce the number of times of performing subsequent processing to the third determination, for instance.

Preferably, in the information processing method of the present disclosure, when hardware performance of the weight reduction model determined not to meet the third performance requirement in the third determination meets a first condition, the weight reduction processing is performed using a parameter different from a parameter used in the previously performed weight reduction processing, and the third determination is performed as to whether a weight reduction model obtained by the weight reduction processing using the different parameter meets the third performance requirement.

According to this, even when the third performance requirement is not met, when the current performance meets a requirement close to the third performance requirement, the weight reduction processing is performed with a changed parameter. Therefore, it is possible to efficiently determine a weight reduction model that meets the third performance requirement.

Preferably, in the information processing method of the present disclosure, (i) when hardware performance of the weight reduction model determined not to meet the third performance requirement in the third determination does not meet the first condition, or (ii) when a number of determinations, in which it is determined that the third performance requirement is not met, is greater than or equal to a second number, the configuration of the machine learning model is changed, and the first determination is performed as to whether the machine learning model in the changed configuration meets the first performance requirement.

According to this, when the third performance requirement is not met, and the number of determinations, in which the third performance requirement is not met, is greater than or equal to the second number of times, the configuration of the machine learning model is changed. Therefore, it is possible to reduce the number of times of performing the weight reduction processing. Thus, it is possible to efficiently decide a machine learning model.

Preferably, in the information processing method of the present disclosure, fourth determination is performed as to whether the weight reduction model determined to meet the third performance requirement in the third determination meets a fourth performance requirement which is a requirement on hardware performance of real machine, and when it is determined that the fourth performance requirement is met in the fourth determination, information indicating that the fourth performance requirement is met is output.

According to this, the fourth determination is performed on the weight reduction model which has been determined to meet the third performance requirement in the third determination, and thus it is possible to reduce the number of times of performing the fourth determination.

Preferably, in the information processing method of the present disclosure, when the hardware performance of the weight reduction model determined not to meet the fourth performance requirement in the fourth determination meets a second condition, the weight reduction processing is performed using a parameter different from a parameter used in the previously performed weight reduction processing.

According to this, even when the fourth performance requirement is not met, when the current performance meets a requirement close to the fourth performance requirement, the weight reduction processing is performed with a changed parameter, thus it is possible to efficiently determine a weight reduction model that meets the fourth performance requirement.

Preferably, in the information processing method of the present disclosure, (i) when the hardware performance of the weight reduction model determined not to meet the fourth performance requirement in the fourth determination does not meet the second condition, or (ii) when a number of determinations, in which it is determined that the fourth performance requirement is not met, is greater than or equal to a third number, the configuration of the machine learning model is changed, and the first determination is performed as to whether the machine learning model in the changed configuration meets the first performance requirement.

According to this, when the fourth performance requirement is not met, and the number of determinations, in which the fourth performance requirement is not met, is greater than or equal to the third number of times, the configuration of the machine learning model is changed. Therefore, it is possible to reduce the number of times of performing the weight reduction processing. Thus, it is possible to efficiently decide a machine learning model.

Preferably, in the information processing method of the present disclosure, fifth determination is performed as to whether the weight reduction model determined to meet the fourth performance requirement in the fourth determination meets a fifth performance requirement which is a requirement on evaluation value of output of a machine learning model, and when it is determined that the fifth performance requirement is met, information indicating that the fifth performance requirement is met is output.

According to this, the fifth determination is performed on the weight reduction model which has been determined to meet the fourth performance requirement in the fourth determination, and thus it is possible to reduce the number of times of performing the fifth determination.

Preferably, in the information processing method of the present disclosure, when an evaluation value of the weight reduction model determined not to meet the fifth performance requirement in the fifth determination meets a third condition, the weight reduction processing is performed using a parameter different from a parameter used in the previously performed weight reduction processing.

According to this, even when the fifth performance requirement is not met, when the current performance meets a requirement close to the fifth performance requirement, the weight reduction processing is performed with a changed parameter, thus it is possible to efficiently determine a weight reduction model that meets the fifth performance requirement.

Preferably, in the information processing method of the present disclosure, (i) when the evaluation value of the weight reduction model determined not to meet the fifth performance requirement in the fifth determination does not meet the third condition, or (ii) when a number of determinations, in which it is determined that the fifth performance requirement is not met, is greater than or equal to a fourth number, the configuration of the machine learning model is changed, and the first determination is performed as to whether the machine learning model in the changed configuration meets the first performance requirement.

According to this, even when the weight reduction processing is performed with a changed parameter, and the number of determinations, in which an obtained weight reduction model does not meet the fifth performance requirement, is greater than or equal to the fourth number of times, the configuration of the machine learning model is changed. Therefore, it is possible to reduce the number of times of performing the weight reduction processing. Thus, it is possible to efficiently decide a machine learning model.

It should be noted that general or specific embodiments may be implemented as a system, a device, an integrated circuit, a computer program, a storage medium such as a computer-readable CD-ROM, or any selective combination thereof.

Hereinafter, an information processing method and an information processing system according to an aspect of the present disclosure will be specifically described with reference to the drawings.

It is to be noted that each of the embodiments described below presents a specific example of the present disclosure. The numerical values, shapes, components, steps, and order of the steps that are presented in the following embodiments are examples are not intended to limit the present disclosure. Those components in the following embodiments, which are not stated in the independent claim that defines the most generic concept are each described as an arbitrary component.

Embodiment

Hereinafter, an embodiment will be described with reference to FIGS. 1 to 7.

[1-1. Configuration]

FIG. 1 is a diagram for explaining the outline of an information processing system according to an embodiment.

An information processing system 1 includes an information processing device 100, an input/output device 200, and a processor 300. Information processing system 1 is a system that decides an appropriate machine learning model for a designated processor.

In the information processing system 1, the information processing device 100 is coupled to the input/output device 200 to allow communication therebetween via a communication network. The information processing device 100 is, for instance, a server. The input/output devices 200 is, for instance, a desktop personal computer (PC), a tablet terminal, or a laptop PC. Also, the communication network may be, for instance, a general-purpose communication network such as the Internet, or a dedicated communication network. The processor 300 is the processor of a real machine to be tested, and includes multiple types of processors.

The information processing device 100 obtains from the input/output device 200 hardware information indicating the hardware performance of a processor, and test requirement information indicating the performance requirements of the processor and a machine learning model. The details of the performance requirements will be described later. The information processing device 100 then determines a machine learning model by performing the later-described decision processing based on the hardware information and the test requirement information obtained from the input/output device 200, and outputs the decided machine learning model to the input/output device 200.

It is to be noted that the information processing device 100 may be a component of a cloud computing system, and may be coupled to the input/output device 200 via the Internet or the like.

[1-2. Hardware Configuration]

The hardware configuration of the information processing device 100 will be described with reference to FIG. 2.

Figure 2:
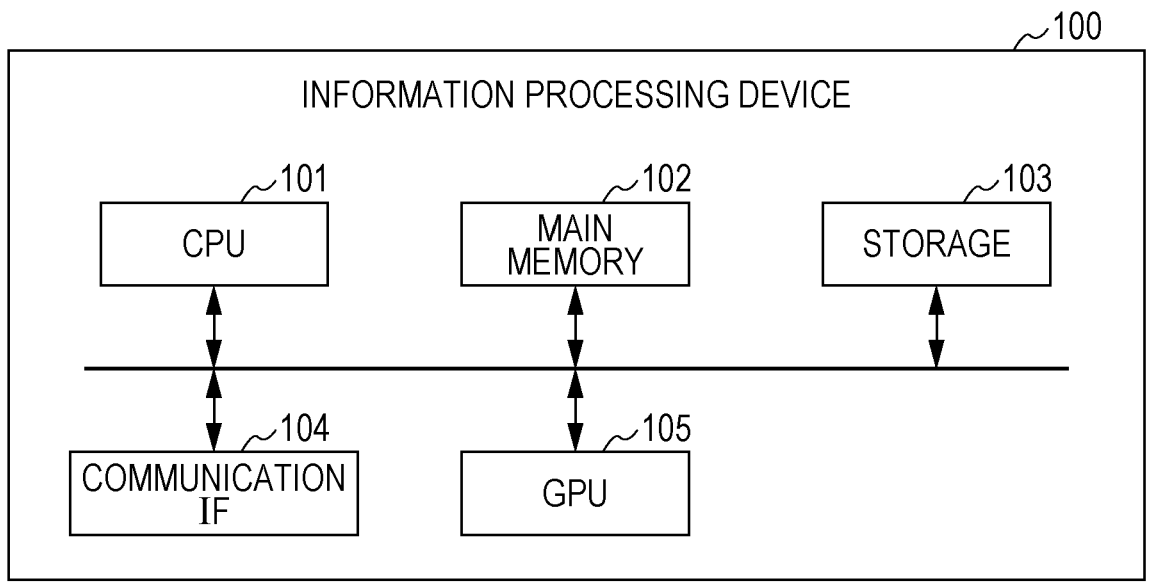
FIG. 2 is a block diagram illustrating an example of a hardware configuration of the information processing device according to the embodiment.

FIG. 2 is a block diagram illustrating an example of a hardware configuration of the information processing device according to the embodiment.

As illustrated in FIG. 2, the information processing device 100 includes a central processing unit (CPU) 101, a main memory 102, a storage 103, and communication interface (IF) 104 and, a graphics processing unit (GPU) 105 as the hardware configuration.

The CPU 101 is a processor that executes a control program stored in the storage 103.

The main memory 102 is a volatile storage area that is used as a work area when the CPU 101 executes the control program.

The storage 103 is a non-volatile storage area that stores the control program, and contents, for instance.

The communication IF 104 is a communication interface that communicates with the input/output device 200 via a communication network. The communication IF 104 is, for instance, a wired LAN interface. The communication IF 104 may be a wireless LAN interface. Also, the communication IF 104 is not limited to only a LAN interface, but also may be any type of communication IF as long as the communication IF 104 can establish communication connection with a communication network.

The GPU 105 is a processor that performs processing of machine learning.

The hardware configuration of the input/output device 200 will be described with reference to FIG. 3.

Figure 3:
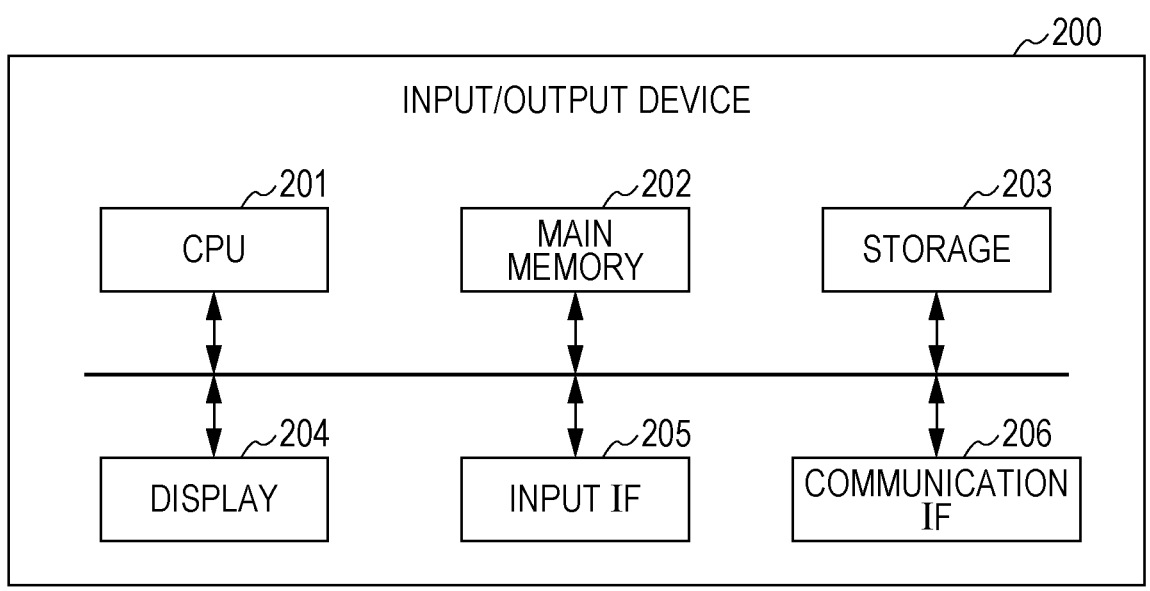
FIG. 3 is a block diagram illustrating an example of a hardware configuration of an input/output device.

FIG. 3 is a block diagram illustrating an example of the hardware configuration of the input/output device.

As illustrated in FIG. 3, the input/output device 200 includes a central processing unit (CPU) 201, a main memory 202, a storage 203, a display 204, an input interface (IF) 205, and a communication IF 206 as the hardware configuration. In other words, the input/output device 200 may be called as an information processing device other than the information processing device 100.

The CPU 201 is a processor that executes a control program stored in the storage 203.

The main memory 202 is a volatile storage area that is used as a work area when the CPU 201 executes the control program.

The storage 203 is a non-volatile storage area that stores the control program, and contents, for instance.

The display 204 is a display device that displays a video including an image. For instance, the display 204 is a liquid crystal display, or an organic EL display.

The input IF 205 is an interface for receiving input from a user. The input IF 205 may be a pointing device such as a mouse, a touch-pad, a touch panel, and a trackball, or may be a keyboard.

The communication IF 206 is a communication interface that communicates with the information processing device 100 via a communication network. The communication IF 206 may be, for instance, a wired LAN interface, or a wireless LAN interface. Also, the communication IF 206 is not limited to only a LAN interface, but also may be any type of communication IF as long as the communication IF 104 can establish communication connection with a communication network.

[1-3. Functional Configuration]

Next, the functional configuration of the information processing system 1 will be described with reference to FIG. 4.

Figure 4:
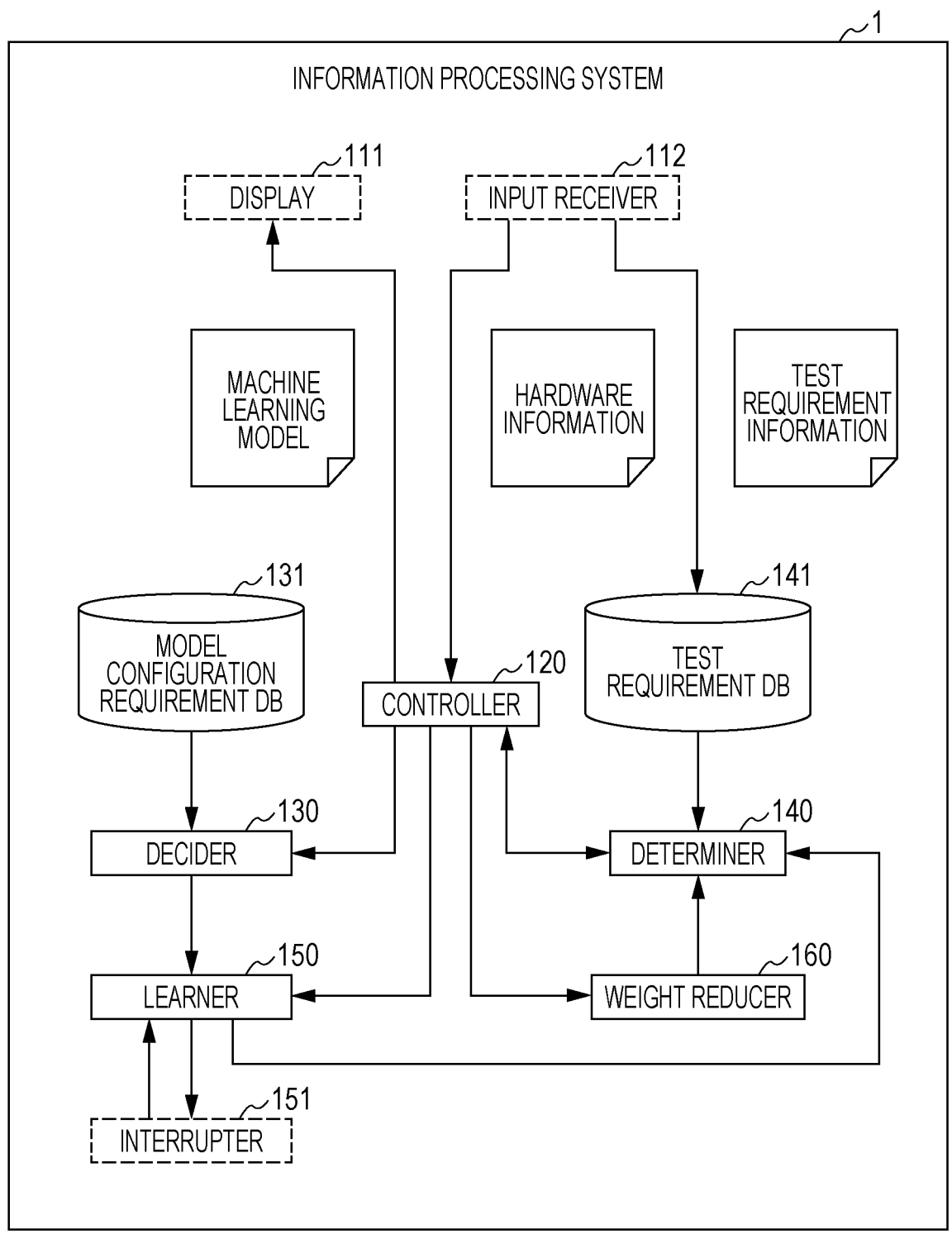
FIG. 4 is a block diagram illustrating an example of a functional configuration of an information processing system.

FIG. 4 is a block diagram illustrating an example of the functional configuration of the information processing system.

First, the functional configuration of the input/output device 200 will be described.

The information processing system 1 includes a controller 120, a decider 130, a model configuration requirement database (DB) 131, a determiner 140, a test requirement database (DB) 141, a learner 150, and a weight reducer 160 as the functional configuration. The information processing system 1 may further include a display 111, an input receiver 112, and an interrupter 151.

The display 111 displays an user interface (UI) to identify the hardware information of a processor for which a machine learning model is to be used, and test requirement information indicating performance requirement. In addition, the display 111 may display UI for notifying a user that hardware information and test requirement information selected according to input received by the input receiver 112 have been transmitted to the information processing device 100. Also, the display 111 may display information on a machine learning model decided by the information processing device 100. The display 111 is implemented, for instance, by the CPU 201, the main memory 202, the storage 203, and the display 204 of the input/output device 200.

The input receiver 112 receives input for an UI displayed on the display 111. Specifically, the input receiver 112 receives information indicating hardware information on a processor for which a machine learning model is to be used, and test requirement information for the UI to identify the hardware information and the test requirement information displayed on the display 111. The input receiver 112 outputs to the controller 120 hardware information identified according to a received input. Also, the input receiver 112 outputs test requirement information generated according to the received input to the test requirement DB 141, and the test requirement information is stored in the test requirement DB 141. It is to be noted that the test requirement information may not be generated according to input via the input receiver 112, and may be pre-stored in the test requirement DB 141. In addition, the test requirement information stored in the test requirement DB 141 may be changed according to information obtained from an external device.

For instance, the input receiver 112 may receive input of identification information such as a model number for identifying a processor, and may identify hardware information associated with the received identification information among association information pieces in which identification information and hardware information on processor are associated with each other. The input/output device 200 may obtain an association information piece from an external information processing device via a communication network, or may utilize the association information pieces pre-stored in the storage 203. For instance, the input receiver 112 may directly receive hardware information on a processor. The hardware information is information that indicates, for instance, the processing speed and power consumption of a processor.

For instance, the input receiver 112 receives requirement on processing speed and power consumption, in short, requirement on hardware performance. The requirement on processing speed is, for instance, that a total time taken for predetermined calculation processing and memory transfer processing is shorter than a reference time. The requirement on power consumption is, for instance, that the power consumption used for performing predetermined processing is lower than a predetermined reference power.

For instance, the input receiver 112 receives requirement on accuracy rate of output of a machine learning model, in short, requirement on evaluation value. For instance, the requirement on accuracy rate is that an accuracy rate when a predetermined test is conducted is higher than a reference accuracy rate.

The test requirement information includes the first to fifth performance requirements which serve as respective references of the first to fifth determination made by the determiner 140, and different values may be set to respective requirements. The first performance requirement, the third performance requirement, and the fourth performance requirement are requirements on hardware performance, for instance, the performance is higher than a threshold defined for at least one of processing speed, power consumption, memory transfer amount, and calculation amount per unit time. The second performance requirement and the fifth performance requirement are, for instance, requirements on evaluation value of output of a machine learning model, specifically for instance, the performance is higher than a threshold defined for at least one of accuracy rate, precision, recall, F value, error, and incorrect rate.

The input receiver 112 is implemented, for instance, by the input IF 205 and the communication IF 206 of the input/output device 200.

The controller 120 performs decision processing for deciding a machine learning model by controlling the decider 130, the determiner 140, the learner 150, and the weight reducer 160. Specifically, the controller 120 performs the later-described decision processing on the configuration of a machine learning model temporarily decided by the decider 130. The controller 120 decides the processing to be performed next in the decision processing, using determination results of the first to fifth determination made by the determiner 140. The details of deciding the processing to be performed next by the controller 120 will be described later. The controller 120 is implemented, for instance, by the CPU 101, the main memory 102, the storage 103, and the communication IF 104 of the information processing device 100.

The decider 130 decides the configuration of a machine learning model. Specifically, as the configuration of the machine learning model used for decision processing, the decider 130 decides one of the configurations of multiple machine learning models having different configurations stored in the model configuration requirement DB 131. The machine learning model decided by the decider 130 is, for instance, the network configuration of a neural network. The configuration of a neural network varies with, for instance, the number of hierarchies and the number of units at each hierarchy.

Also, according to an instruction from the controller 120, the decider 130 may decide one of the configurations of multiple machine learning models stored in the model configuration requirement DB 131 as the configuration of the machine learning model used for decision processing, the one being excluded from the configurations of the machine learning model once decided. In other words, according to an instruction from the controller 120, the decider 130 may change the configuration of the machine learning model used for decision processing from the configuration of a machine learning model already decided to the configuration of another machine learning model. The decider 130 changes the configuration of the machine learning model, for instance by changing the number of hierarchies or the number of units. When the memory transfer amount of the machine learning model is found to exceed the first performance requirement, the third performance requirement, or the fourth performance requirement by the test of the determiner 140, the decider 130 reduces the number of hierarchies or the number of units. Similarly, when one of the processing speed, power consumption, calculation amount per unit time is exceeded, the number of hierarchies or the number of units is reduced.

When the configuration of the machine learning model is changed, the decider 130 may decide the configuration of the next machine learning model according to a sequence predetermined for the configurations of multiple machine learning models stored in the model configuration requirement DB 131, or may decide the configuration of the next machine learning model at random. When the configuration of the machine learning model is changed, the decider 130 may also decide the configuration of the next machine learning model according to a predetermined algorithm using determination results of the first to fifth determination made by the determiner 140 obtained by the controller 120.

The decider 130 outputs to the controller 120 the configuration of the machine learning model decided to be used in the decision processing. The decider 130 is implemented, for instance, by the CPU 101, the main memory 102, and the storage 103 of the information processing device 100. Also, the model configuration requirement DB 131 is implemented, for instance, by the storage 103 of the information processing device 100.

According to an instruction from the controller 120, the determiner 140 performs first determination as to whether or not the machine learning model decided to be used in the decision processing by the decider 130 meets the first performance requirement. The determiner 140, when performing the first determination, obtains the first performance requirement from the test requirement DB 141. The determiner 140 performs the first determination using the obtained the first performance requirement. The test requirement DB 141 includes the first performance requirement. The first performance requirement is that the performance is higher than a threshold T11. Here, a description is given using an example in which the first performance requirement is for processing speed.

Thus, in the first determination, the determiner 140 determines whether or not the processing speed calculated from the configuration of the machine learning model decided by the decider 130 exceeds the threshold T11, and when the processing speed exceeds the threshold T11, determines that the first performance requirement is met. In this manner, when a greater value indicates higher hardware performance in the first determination, the determiner 140 determines whether or not the value exceeds the threshold defined in the first performance requirement, and when the value exceeds the threshold, determines that the first performance requirement is met.

When the first determination is performed for power consumption, the determiner 140 determines whether or not the power consumption is less than the threshold defined in the first performance requirement on power consumption. This is because a lower power consumption indicates higher performance. That is, when a smaller value indicates higher hardware performance in the first determination, the determiner 140 determines whether or not the value is less than the threshold defined in the first performance requirement, and when the value is less than the threshold, determines that the first performance requirement is met.

The determiner 140 outputs a determination result in the first determination to the controller 120.

Also, according to an instruction from the controller 120, the determiner 140 performs second determination as to whether or not a learned model obtained from learning by the learner 150 meets the second performance requirement. When performing the second determination, the determiner 140 obtains the second performance requirement from the test requirement DB 141, and performs the second determination using the obtained second performance requirement. The test requirement DB 141 includes the second performance requirement. The second performance requirement is that the performance is higher than a threshold T21. Here, a description is given using an example in which the second performance requirement is for accuracy rate.

Thus, in the second determination, the determiner 140 determines whether or not the accuracy rate calculated as the evaluation value of output of the learned model exceeds the threshold T21. In this manner, when a larger evaluation value indicates higher performance in the second determination, the determiner 140 determines whether or not the value exceeds the threshold defined in the second performance requirement, and when the value exceeds the threshold, determines that the second performance requirement is met. It is to be noted that when a smaller evaluation value indicates higher performance in the second determination, the determiner 140 determines whether or not the evaluation value is less than the threshold, and when the evaluation value is less than the threshold, determines that the second performance requirement is met.

The determiner 140 outputs a determination result in the second determination to the controller 120.

Also, according to an instruction from the controller 120, the determiner 140 may perform third determination as to whether or not a weight reduction model obtained by the weight reduction processing performed by the weight reducer 160 meets the third performance requirement. When performing the third determination, the determiner 140 obtains the third performance requirement from the test requirement DB 141. The determiner 140 then performs the third determination using the obtained third performance requirement. The test requirement DB 141 includes the third performance requirement. The third performance requirement is that the performance is higher than a threshold T31. Here, a description is given using an example in which the third performance requirement is for processing speed. Also, the condition for hardware performance specified in the third performance requirement may be more stringent than the condition for hardware performance specified in the first performance requirement. Specifically, when a larger value indicates higher hardware performance, the threshold T31 is greater than the threshold T11, and when a smaller value indicates higher hardware performance, the threshold T31 is less than the threshold T11.

As an example, when the third performance requirement is for processing speed, in the third determination, the determiner 140 determines whether or not a processing speed calculated from the weight reduction model obtained by the weight reduction processing exceeds the threshold T31, and when the processing speed exceeds the threshold T31, determines that the third performance requirement is met. In this manner, when a larger value indicates higher hardware performance in the third determination, the determiner 140 determines whether or not the value exceeds the threshold defined in the third performance requirement, and when the value exceeds the threshold, determines that the third performance requirement is met. Similarly to the first determination, when a smaller value indicates higher hardware performance in the third determination, the determiner 140 determines whether or not the value is less than the threshold defined in the third performance requirement, and when the value is less than the threshold, determines that the third performance requirement is met.

The determiner 140 outputs a determination result in the third determination to the controller 120.

Also, according to an instruction from the controller 120, the determiner 140 may perform fourth determination as to whether or not the weight reduction model determined to meet the third performance requirement in the third determination meets the fourth performance requirement. When performing the fourth determination, the determiner 140 obtains the fourth performance requirement from the test requirement DB 141. The determiner 140 then performs the fourth determination using the obtained fourth performance requirement. The determiner 140 performs the fourth determination on a processor which is among connected processors 300 and corresponds to the hardware information obtained by the controller 120. The fourth performance requirement is for the hardware performance of the processor 300 of a real machine, is that the performance is higher than a threshold T41. Also, the condition for hardware performance specified in the fourth performance requirement may be more stringent than the condition for hardware performance specified in the third performance requirement. Specifically, when a larger value indicates higher hardware performance, the threshold T41 is greater than the threshold T31, and when a smaller value indicates higher hardware performance, the threshold T41 is less than the threshold T31.

As an example, when the fourth performance requirement is for processing speed, in the fourth determination, the determiner 140 determines whether or not a processing speed calculated from the weight reduction model determined to meet the third performance requirement in the third determination exceeds the threshold T41, and when the processing speed exceeds the threshold T41, determines that the fourth performance requirement is met. In this manner, when a larger value indicates higher hardware performance in the fourth determination, the determiner 140 determines whether or not the value exceeds the threshold defined in the fourth performance requirement, and when the value exceeds the threshold, determines that the fourth performance requirement is met. Similarly to the first and third determination, when a smaller value indicates higher hardware performance in the fourth determination, the determiner 140 determines whether or not the value is less than the threshold defined in the fourth performance requirement, and when the value is less than the threshold, determines that the fourth performance requirement is met.

The determiner 140 outputs a determination result in the fourth determination to the controller 120.

Also, according to an instruction from the controller 120, the determiner 140 may perform the fifth determination as to whether or not the weight reduction model determined to meet the fourth performance requirement in the fourth determination meets the fifth performance requirement. Specifically, when the determiner 140 conducts a predetermined test for the processor 300 of the real machine using the weight reduction model determined to meet the fourth performance requirement in the fourth determination, the determiner 140 performs the fifth determination as to whether the fifth performance requirement is met. When performing the fifth determination, the determiner 140 obtains the fifth performance requirement from the test requirement DB 141, and performs the fifth determination using the obtained fifth performance requirement. The test requirement DB 141 includes the fifth performance requirement. The fifth performance requirement is that the performance is higher than a threshold T51. Here, a description is given using an example in which the fifth performance requirement is for accuracy rate.

Thus, in the fifth determination, the determiner 140 determines whether or not the accuracy rate calculated as the evaluation value of output of the learned model exceeds the threshold T51. In this manner, when a larger evaluation value indicates higher performance in the fifth determination, the determiner 140 determines whether or not the value exceeds the threshold defined in the fifth performance requirement, and when the value exceeds the threshold, determines that the fifth performance requirement is met. It is to be noted that when a smaller evaluation value indicates higher performance in the fifth determination, the determiner 140 determines whether or not the value is less than the threshold, and when the value is less than the threshold, determines that the fifth performance requirement is met.

The determiner 140 outputs a determination result in the fifth determination to the controller 120.

The determiner 140 is implemented, for instance, by the CPU 101, the main memory 102, and the storage 103 of the information processing device 100. Also, the test requirement DB 141 is implemented, for instance, by the storage 103 of the information processing device 100.

According to an instruction from the controller 120, the learner 150 performs learning using a machine learning model in a configuration which has been determined to meet the first performance requirement. The learner 150 performs learning for recognition processing used for ADAS, an automatic operation system, for instance. The learner 150 is implemented, for instance, by the CPU 101, the main memory 102, and the storage 103 of the information processing device 100.

The interrupter 151 obtains a learning situation of the learner 150, and when the accuracy (error) does not converge in an early stage of learning, learning by the learner 150 is interrupted. The interrupter 151 is implemented, for instance, by the CPU 101, the main memory 102, and the storage 103 of the information processing device 100.

The weight reducer 160 performs weight reduction processing on a learned model which has been determined to meet the second performance requirement in the second determination. The weight reducer 160 performs, for instance, weight quantization processing, or weight pruning processing, as the weight reduction processing. The weight quantization processing is quantization processing, for instance, from a single precision floating point number (32 bits) or a double precision floating point number (64 bits) to a half precision floating point number (16 bits) or a fixed point number (any number of bits from 16 bits, 8 bits, and 64 bits to 1 bit). The weight pruning processing is processing to eliminate the weight coefficient of a neural network whose contribution to output is low. The weight reducer 160 is implemented, for instance, by the CPU 101, the main memory 102, and the storage 103 of the information processing device 100.

[1-4. Operation]

Next, the operation of the information processing system 1 according to the embodiment will be described.

Figure 5:
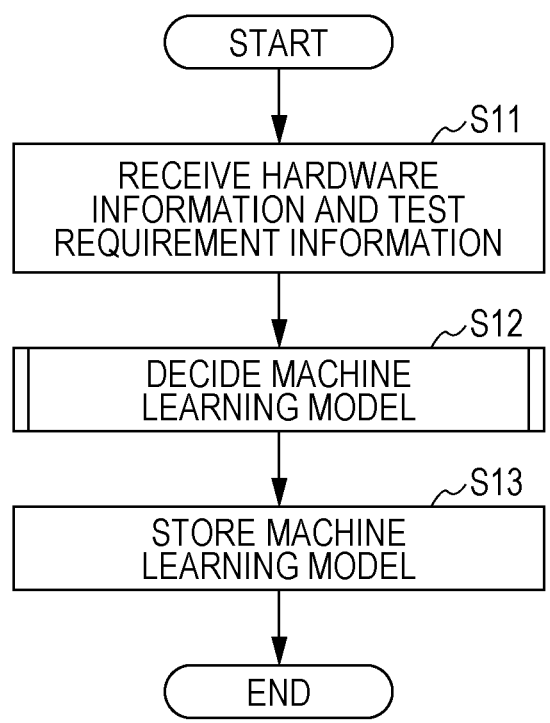
FIG. 5 is a flowchart illustrating an example of an information processing method in the information processing system.

FIG. 5 is a flowchart illustrating an example of an information processing method in the information processing system.

First, a user operates the input/output device 200 to execute an application for deciding an optimal machine learning model for a predetermined processor in the input/output device 200. Thus, in the input/output device 200, an UI for identifying the hardware information and test requirement information on a processor as a processing target is displayed on the display 204. Thus, in the information processing system 1, an UI for identifying the hardware information is displayed on the display 111.

In the information processing system 1, the input receiver 112 receives input for the UI displayed on the display 111 (S11).

Subsequently, the information processing system 1 performs decision processing for a machine learning model according to the hardware information and the test requirement information identified by the input for the UI (S12). The details of decision processing for a machine learning model will be described later.

The information processing system 1 then stores the machine learning model decided in the decision processing (S13). The machine learning model decided in the decision processing is stored, for instance, in the storage 103 of the input/output device 200 of the information processing system 1.

The details of the decision processing according to the embodiment will be described with reference to FIGS. 6 and 7.

Figure 6:
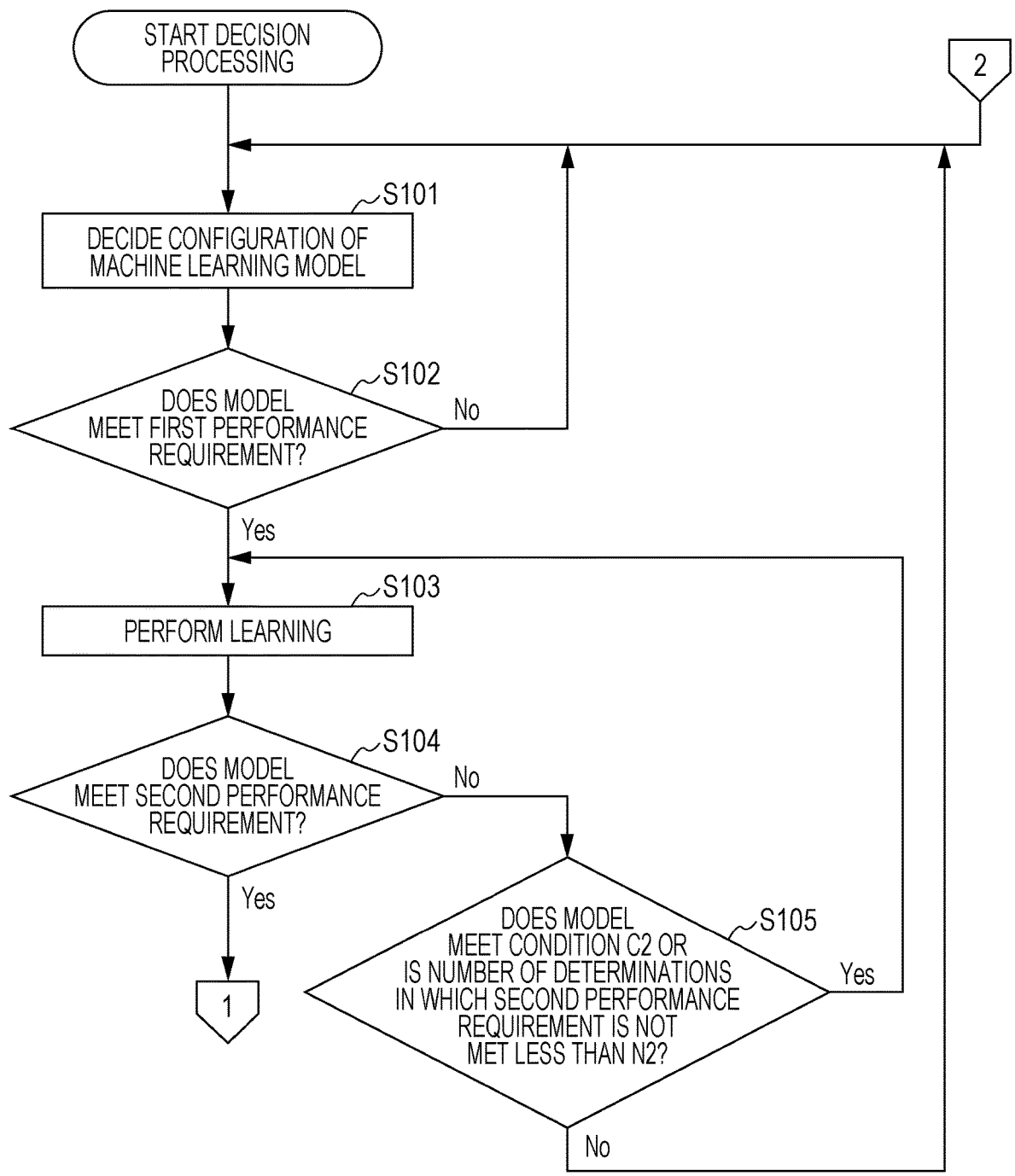
FIG. 6 is a flowchart illustrating an example of details of decision processing according to the embodiment.
Figure 7:
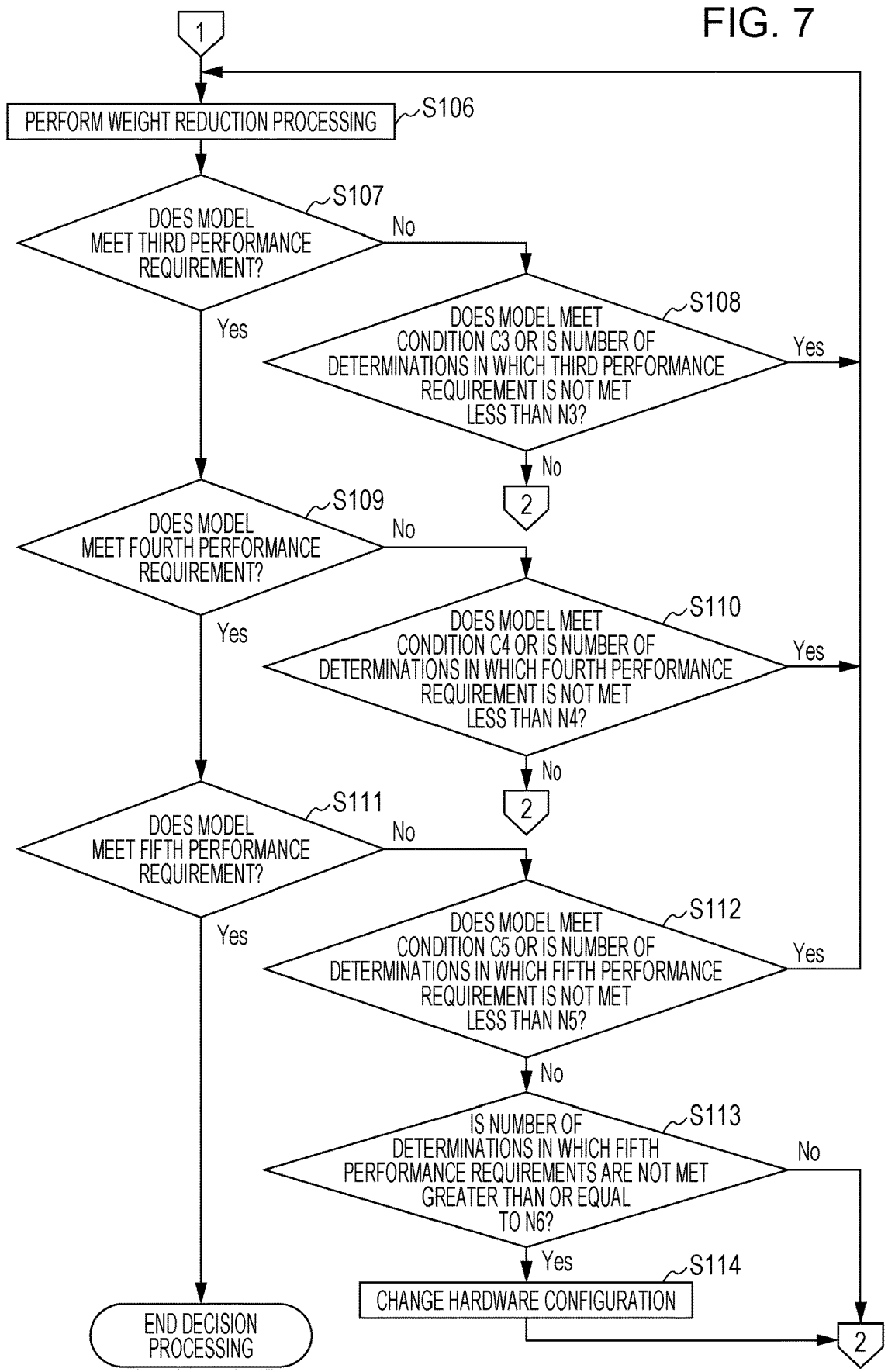
FIG. 7 is a flowchart illustrating an example of details of decision processing according to the embodiment.

FIGS. 6 and 7 are each a flowchart illustrating an example of the details of the decision processing according to the embodiment.

When the decision processing is started, the controller 120 causes the decider 130 to decide the configuration of a machine learning model as described above (S101). The decider 130 outputs the decided configuration of a machine learning model to the controller 120.

The controller 120 causes the determiner 140 to perform first determination as to whether the machine learning model obtained from the decider 130 meets the first performance requirement which is a requirement on hardware performance (S102). The determiner 140 determines whether or not a processing speed, for instance, calculated from the configuration of the machine learning model decided by the decider 130 exceeds the threshold T11. The determiner 140 outputs a determination result of the first determination to the controller 120.

When the determiner 140 determines that the first performance requirement is met in the first determination (Yes in S102), the controller 120 causes the learner 150 to perform learning using the machine learning model in the configuration determined to meet the first performance requirement (S103). Specifically, when the determiner 140 determines that a processing speed calculated from the decided configuration of the machine learning model exceeds the threshold T11, the controller 120 causes the learner 150 to perform the above-mentioned learning. While the learner 150 is executing learning, the interrupter 151 obtains a learning situation of the learner 150, and when the accuracy (error) does not converge in an early stage of learning, learning by the learner 150 may be interrupted. The learner 150 outputs a learned model obtained by the learning to the controller 120.

On the other hand, when the determiner 140 determines that the first performance requirement is not met in the first determination (No in S102), the controller 120 causes the decider 130 to change the configuration of the machine learning model and decide the configuration of another machine learning model. Specifically, when the determiner 140 determines that the processing speed calculated from the decided configuration of the machine learning model is lower than or equal to the threshold T11, the controller 120 causes the decider 130 to perform the processing in step S101.

When step S103 is completed, the controller 120 causes the determiner 140 to perform the second determination as to whether or not the learned model obtained from the learner 150 meets the second performance requirement which is a requirement on evaluation value of output of machine learning model (S104). For instance, the determiner 140 determines whether or not the accuracy rate calculated as the evaluation value of output of the learned model exceeds the threshold T21. The determiner 140 outputs a determination result of the second determination to the controller 120. That is, when the determiner 140 determines that the learned model meets the second performance requirement in the second determination, the determiner 140 outputs to the controller 120 information indicating that the first performance requirement and the second performance requirement are met. It is to be noted that the controller 120 may cause the display 111 to display the information.

When the determiner 140 determines that the second performance requirement is met in the second determination (Yes in S104), the controller 120 causes the weight reducer 160 to perform the weight reduction processing on the learned model which has been determined to meet the second performance requirement (S106). The weight reducer 160 outputs a weight reduction model obtained by the weight reduction processing to the controller 120.

On the other hand, when the determiner 140 determines that the second performance requirement is not met in the second determination (No in S104), the controller 120 causes the determiner 140 to determine whether the evaluation value of the output of the learned model meets condition C2, or the number of determinations, in which it is determined that the second performance requirement is not met, is less than N2 (S105). It is to be noted that the second performance requirement is a requirement on accuracy rate, and a larger value of the accuracy rate indicates higher performance. A threshold T22 is a value smaller than the threshold T21. Specifically, "the evaluation value of the output of the learned model meets condition C2" is, for instance, that the accuracy rate as an evaluation value is higher than or equal to the threshold T22.

On the other hand, when the second performance requirement is for an evaluation value, such as an error or an accuracy rate, in which a smaller value indicates higher performance, the threshold T22 is a value larger than the threshold T21. Thus, "the evaluation value of the output of the learned model meets condition C2" is, for instance, that the error or the accuracy rate as an evaluation value is lower than or equal to the threshold T22. Thus, the determiner 140 in this case determines in step S105 whether or not the evaluation value is lower than or equal to the threshold T22, or the number of determinations, in which it is determined that the second performance requirement is not met, is less than N2.

When the accuracy rate is higher than or equal to the threshold T22, or the number of determinations, in which it is determined that the second performance requirement is not met, is less than N2 (Yes in S105), the controller 120 causes the learner 150 to perform the learning in step S103 again with a parameter different from the one used in the previously performed learning. In this case, the controller 120 causes the learner 150 to perform learning by changing the learning rate of a neural network as a parameter to a different value, for instance. Subsequently, the controller 120 causes the determiner 140 to perform the second determination in step S104 as to whether or not a learned model obtained by learning with the different parameter meets the second performance requirement.

When the accuracy rate is lower than the threshold T22, or the number of determinations, in which it is determined that the second performance requirement is not met, is greater than or equal to N2 (No in S105), the controller 120 causes the decider 130 to change the configuration of the machine learning model and decide the configuration of another machine learning model. In short, in this case, the controller 120 causes the decider 130 to perform the processing in step S101. Subsequently, the controller 120 causes the determiner 140 to perform the first determination in step S102 as to whether or not the machine learning model in the changed configuration meets the first performance requirement.

When step S106 is completed, the controller 120 causes the determiner 140 to perform the third determination as to whether or not a weight reduction model obtained from the weight reducer 160 meets the third performance requirement which is a requirement on hardware performance (S107). The determiner 140 determines whether or not a processing speed calculated from the weight reduction model obtained by the weight reduction processing exceeds the threshold T31, for instance. The determiner 140 outputs a determination result of the third determination to the controller 120. That is, when the determiner 140 determines that the weight reduction model meets the third performance requirement in the third determination, the determiner 140 outputs to the controller 120 information indicating that the third performance requirement is met. It is to be noted that the controller 120 may cause the display 111 to display the information.

When the determiner 140 determines that the third performance requirement is not met in the third determination (Yes in S107), the controller 120 causes the determiner 140 to perform the fourth determination as to whether or not the weight reduction model determined to meet the third performance requirement in the third determination meets the fourth performance requirement which is a requirement on hardware performance of real machine (S109). Specifically, the controller 120 causes the determiner 140 to measure the hardware performance when the processor of a real machine actually executes processing using the weight reduction model, and to determine whether or not the measured hardware performance meets the fourth performance requirement. The determiner 140 measures a processing speed, for instance when the processor of a real machine actually executes processing using the weight reduction model, and determines whether or not the measured processing speed exceeds the threshold T41. The determiner 140 outputs a determination result of the fourth determination to the controller 120. That is, when the determiner 140 determines that the fourth performance requirement is met in the fourth determination, the determiner 140 outputs to the controller 120 information indicating that the fourth performance requirement is met.

When the determiner 140 determines that the third performance requirement is not met in the third determination (No in S107), the controller 120 causes the determiner 140 to determine whether the hardware performance of the weight reduction model meets condition C3, or the number of determinations, in which it is determined that the third performance requirement is not met, is less than N3 (S108). It is to be noted that the third performance requirement is a requirement on processing speed, and a larger value of processing speed indicates higher hardware performance. A threshold T32 is a value smaller than the threshold T31. Specifically, "the hardware performance of the weight reduction model meets condition C3" is, for instance, that the processing speed as hardware performance is higher than or equal to the threshold T32.

On the other hand, when the third performance requirement is for hardware performance in which a smaller value indicates higher performance like power consumption, the threshold T32 is a value larger than the threshold T31. Thus, "the hardware performance of the weight reduction model meets condition C3" is, for instance, that the power consumption as hardware performance is lower than or equal to the threshold T32. Thus, the determiner 140 in this case determines in step S108 whether or not the hardware performance is lower than or equal to the threshold T32, or the number of determinations, in which it is determined that the third performance requirement is not met, is less than N3.

When the processing speed is higher than or equal to the threshold T32, and the number of determinations, in which it is determined that the third performance requirement is not met, is less than N3 (Yes in S108), the controller 120 causes the weight reducer 160 to perform the weight reduction processing again with a parameter different from the one used in the previously performed weight reduction processing. In this case, the controller 120 causes the weight reducer 160 to change the degree of weight reduction, as the parameter, of the weight reduction processing to a different degree, and to perform the weight reduction processing, for instance. Subsequently, the controller 120 causes the determiner 140 to perform the third determination in step S107 as to whether or not a weight reduction model obtained by the weight reduction processing with a different parameter meets the third performance requirement.

When the processing speed is lower than the threshold T32, or the number of determinations, in which it is determined that the third performance requirement is not met, is greater than or equal to N3 (No in S108), the controller 120 causes the decider 130 to change the configuration of the machine learning model and decide the configuration of another machine learning model. In short, in this case, the controller 120 causes the decider 130 to perform the processing in step S101. Subsequently, the controller 120 causes the determiner 140 to perform the first determination in step S102 as to whether or not the machine learning model in the changed configuration meets the first performance requirement.

When the determiner 140 determines that the fourth performance requirement is not met in the fourth determination (Yes in S109), the controller 120 causes the determiner 140 to perform the fifth determination as to whether or not the weight reduction model determined to meet the fourth performance requirement in the fourth determination meets the fifth performance requirement which is a requirement on evaluation value of output of the machine learning model (S111). For instance, the determiner 140 determines whether or not the accuracy rate calculated as the evaluation value of output of the weight reduction model exceeds the threshold T51. The determiner 140 outputs a determination result of the fifth determination to the controller 120. That is, when the determiner 140 determines that the weight reduction model meets the fifth performance requirement in the fifth determination, the determiner 140 outputs to the controller 120 information indicating that the fifth performance requirement is met. It is to be noted that the controller 120 may cause the display 111 to display the information.

When the determiner 140 determines that the fourth performance requirement is not met in the fourth determination (No in S109), the controller 120 causes the determiner 140 to determine whether the hardware performance of the weight reduction model meets condition C4, or the number of determinations, in which it is determined that the fourth performance requirement is not met, is less than N4 (S110). It is to be noted that the fourth performance requirement is a requirement on processing speed, and a larger value of processing speed indicates higher hardware performance. A threshold T42 is a value smaller than the threshold T41. Specifically, "the hardware performance of the weight reduction model meets condition C4" is, for instance, that the processing speed as hardware performance is higher than or equal to the threshold T42.

On the other hand, when the fourth performance requirement is for hardware performance in which a smaller value indicates higher performance like power consumption, the threshold T42 is a value larger than the threshold T41. Thus, "the hardware performance of the weight reduction model meets condition C4" is, for instance, that the power consumption as hardware performance is lower than or equal to the threshold T42. Thus, the determiner 140 in this case determines in step S110 whether or not the hardware performance is lower than or equal to the threshold T42, or the number of determinations, in which it is determined that the fourth performance requirement is not met, is less than N4.

When the processing speed is higher than or equal to the threshold T42, and the number of determinations, in which it is determined that the fourth performance requirement is not met, is less than N4 (Yes in S110), the controller 120 causes the weight reducer 160 to perform the weight reduction processing again with a parameter different from the one used in the previously performed weight reduction processing. In this case, the controller 120 causes the weight reducer 160 to change the degree of weight reduction, as the parameter, of the weight reduction processing to a different degree, and to perform the weight reduction processing, for instance. Subsequently, the controller 120 causes the determiner 140 to perform the third determination in step S107 as to whether or not a weight reduction model obtained by the weight reduction processing with a different parameter meets the third performance requirement.

When the processing speed is lower than the threshold T42, or the number of determinations, in which it is determined that the fourth performance requirement is not met, is greater than or equal to N4 (No in S110), the controller 120 causes the decider 130 to change the configuration of the machine learning model and decide the configuration of another machine learning model. In short, in this case, the controller 120 causes the decider 130 to perform the processing in step S101. Subsequently, the controller 120 causes the determiner 140 to perform the first determination in step S102 as to whether or not the machine learning model in the changed configuration meets the first performance requirement.

When the determiner 140 determines that the fifth performance requirement is not met in the fifth determination (Yes in S111), the controller 120 decides the weight reduction model determined to meet the fifth performance requirement in the fifth determination as the machine learning model, and completes the decision processing.

When the determiner 140 determines that the fifth performance requirement is not met in the fifth determination (No in S111), the controller 120 causes the determiner 140 to determine whether the evaluation value of the output of the weight reduction model meets condition C5, or the number of determinations, in which it is determined that the fifth performance requirement is not met, is less than N5 (S112). The fifth performance requirement is for an evaluation value in which a larger value indicates higher performance, thus a threshold T52 is a value smaller than the threshold T51. Thus, "the evaluation value of the output of the weight reduction model meets condition C5" is, for instance, that the accuracy rate as the evaluation value is higher than or equal to the threshold T52.

On the other hand, when the fifth performance requirement is for an evaluation value, such as an error or an accuracy rate, in which a smaller value indicates higher performance, the threshold T52 is a value larger than the threshold T51. Thus, "the evaluation value of the output of the weight reduction model meets condition C5" is, for instance, that the error or the accuracy rate as an evaluation value is lower than or equal to the threshold T52. Thus, the determiner 140 in this case determines in step S112 whether or not the evaluation value is lower than or equal to the threshold T52, or the number of determinations, in which it is determined that the fifth performance requirement is not met, is less than N5.

When the accuracy rate is higher than or equal to the threshold T52, and the number of determinations, in which it is determined that the fifth performance requirement is not met, is less than N5 (Yes in S112), the controller 120 causes the weight reducer 160 to perform the weight reduction processing again with a parameter different from the one used in the previously performed weight reduction processing. In this case, the controller 120 causes the weight reducer 160 to change the degree of weight reduction, as the parameter, of the weight reduction processing to a different degree, and to perform the weight reduction processing, for instance. Subsequently, the controller 120 causes the determiner 140 to perform the third determination in step S107 as to whether or not a weight reduction model obtained by the weight reduction processing with a different parameter meets the third performance requirement.

When the accuracy rate is lower than the threshold T52, or the number of determinations, in which it is determined that the fifth performance requirement is not met, is greater than or equal to N5 (No in S112), the controller 120 causes the determiner 140 to determine whether or not the number of determinations, in which it is determined that the fifth performance requirement is not met, is greater than or equal to N6 (S113). It is to be noted that N6 is a value greater than N5.

When the determiner 140 determines that the number of determinations, in which it is determined that the fifth performance requirement is not met, is greater than or equal to N6 (Yes in S113), the controller 120 changes the hardware configuration (S114). For instance, the controller 120 may cause the display 111 to display instructions for prompting a user to change the configuration of a target processor because an optimal machine learning model for a designated configuration of a processor has not been found. Alternatively, the controller 120 may perform processing to automatically change the configuration of a target processor by a predetermined algorithm. Also, the controller 120 may change the first performance requirement, the third performance requirement, and the fourth performance requirement on hardware performance to a less stringent performance requirement.

When the determiner 140 determines that the number of determinations, in which it is determined that the fifth performance requirement is not met, is less than N6 (No in S113), the controller 120 causes the decider 130 to change the configuration of the machine learning model and decide the configuration of another machine learning model. In short, in this case, the controller 120 causes the decider 130 to perform the processing in step S101. Subsequently, the controller 120 causes the determiner 140 to perform the first determination in step S102 as to whether or not the machine learning model in the changed configuration meets the first performance requirement.

[1-5. Effect]

With the information processing system 1 according to the embodiment, the configuration of a machine learning model is changed without performing the second determination until the first performance requirement is met in the first determination, and thus it is possible to reduce the number of times of performing the second determination. Therefore, it is possible to efficiently decide a machine learning model. In addition, it is possible to reduce the processing load and consumption energy of processors.

With the information processing system 1 according to the embodiment, when it is determined N2 times or more that the second performance requirement is not met, the configuration of the machine learning model is changed, and thus the number of times of learning can be reduced. Therefore, it is possible to efficiently decide a machine learning model.

With the information processing system 1 according to the embodiment, the configuration of the machine learning model is changed without performing the second determination, the weight reduction processing, and the third determination until the first performance requirement is met in the first determination. Therefore, it is possible to reduce the number of times of performing the second determination, the weight reduction processing, and the third determination.

In the information processing system 1 according to the embodiment, the condition for hardware performance specified in the third performance requirement is more stringent than the condition for hardware performance specified in the first performance requirement. Therefore, it is possible to reduce the number of times of determination that the first performance requirement is not met, decision of the configuration of the machine learning model, and performing the first determination. Also, more stringent determination is performed in the third determination, thereby making it possible to reduce the number of times of performing subsequent processing to the third determination.

In the information processing system 1 according to the embodiment, since the determination in step S108 is performed, even when the third performance requirement is not met, when the current performance meets a requirement close to the third performance requirement, the weight reduction processing is performed with a changed parameter. Therefore, it is possible to efficiently determine a weight reduction model that meets the third performance requirement.

In the information processing system 1 according to the embodiment, when the third performance requirement is not met, and the number of determinations, in which the third performance requirement is not met, is greater than or equal to N3, the configuration of the machine learning model is changed. Therefore, it is possible to reduce the number of times of performing the weight reduction processing. Thus, it is possible to efficiently decide a machine learning model.

With the information processing system 1 according to the embodiment, the fourth determination is performed on the weight reduction model which has been determined to meet the third performance requirement in the third determination, and thus it is possible to reduce the number of times of performing the fourth determination.

In the information processing system 1 according to the embodiment, since the determination in step S110 is performed, even when the fourth performance requirement is not met, when the current performance meets a requirement close to the fourth performance requirement, the weight reduction processing is performed with a changed parameter, thus it is possible to efficiently determine a weight reduction model that meets the fourth performance requirement.

In the information processing system 1 according to the embodiment, when the fourth performance requirement is not met, and the number of determinations, in which the fourth performance requirement is not met, is greater than or equal to N4, the configuration of the machine learning model is changed. Therefore, it is possible to reduce the number of times of performing the weight reduction processing. Thus, it is possible to efficiently decide a machine learning model.

With the information processing system 1 according to the embodiment, the fifth determination is performed on the weight reduction model which has been determined to meet the fourth performance requirement in the fourth determination, and thus it is possible to reduce the number of times of performing the fifth determination.

In the information processing system 1 according to the embodiment, since the determination in step S112 is performed, even when the fifth performance requirement is not met, when the current performance meets a requirement close to the fifth performance requirement, the weight reduction processing is performed with a changed parameter, thus it is possible to efficiently determine a weight reduction model that meets the fifth performance requirement.

In the information processing system 1 according to the embodiment, when the fifth performance requirement is not met, and the number of determinations, in which the fifth performance requirement is not met, is greater than or equal to N5, the configuration of the machine learning model is changed. Therefore, it is possible to reduce the number of times of performing the weight reduction processing. Thus, it is possible to efficiently decide a machine learning model.

[1-6. Modification]

Although the information processing system 1 according to the embodiment is configured to include the information processing device 100 and the input/output device 200, without being limited to this, the information processing system 1 may include one information processing device. In this case, the hardware configuration of the one information processing device may be the same as the hardware configuration of the input/output device 200.

In the information processing system 1 according to the embodiment, when the configuration of a machine learning model is changed, the decider 130 automatically changes the machine learning model to another machine learning model. However, without being limited to this, when the configuration of a machine learning model is changed, the controller 120 may cause the display 111 to display a prompt to change the configuration of the machine learning model, and to display an UI that receives an instruction for changing the configuration of the machine learning model. In this case, a user may input an instruction to the UI using the input IF 205, and the input receiver 112 may receive a machine learning model in a changed configuration. The input receiver 112 may output the machine learning model in a changed configuration to the controller 120 which may cause the determiner 140 to perform the first determination on the obtained machine learning model.

Although the information processing system 1 according to the embodiment uses a neural network for machine learning, without being limited to this, a decision tree, the Random Forest, a k-nearest neighbor method may be used. When the RandomForest is used, a hyper-parameter is decided as the configuration of a machine learning model. A hyper-parameter is decided by factors such as the number of decision trees, the depth of each decision tree, and the number of leaves (the number of categories of each node). When the number of decision trees, the depth of each decision tree, and the number of leaves of a hyper-parameter are increased, the representational ability can be improved. However, the amount of calculation is increased accordingly.

Bit quantization may be used as the weight reduction processing in this case. In the Random Forest, processing to eliminate a decision tree with a low contribution or processing to eliminate part of the nodes or leaves in a decision tree may be performed as the weight reduction processing.

In the information processing system 1 according to the embodiment, processing to decide and change a network configuration is performed in the decider 130. However, the processing may not be performed. For instance, the following information processing methods may be performed.

The following processing is performed using a processor. Learning is performed using a machine learning model. The second determination as to whether or not a learned model obtained by the learning meets the second performance requirement which is a requirement on evaluation value of output of the machine learning model. When it is determined in the second determination that the learned model meets the second performance requirement, weight reduction processing is performed on the learned model which has been determined to meet the second performance requirement in the second determination. Subsequently, the third determination as to whether or not a weight reduction model obtained by the weight reduction processing meets the third performance requirement which is a requirement on hardware performance. Then the fourth determination as to whether or not the weight reduction model determined to meet the third performance requirement in the third determination meets the fourth performance requirement which is a requirement on hardware performance of real machine. When it is determined that the fourth performance requirement is met in the fourth determination, information indicating that the fourth performance requirement is met is output, and when the hardware performance of the weight reduction model determined not to meet the third performance requirement in the third determination meets the first condition, that is, the condition C3, the weight reduction processing is performed with a parameter different from the one used in the previously performed weight reduction processing.

Even in this case, when it is determined that the third performance requirement is not met in the third determination, the weight reduction processing may be performed again, it is possible to reduce the number of times of performing the fourth determination as to whether or not the weight reduction model determined to meet the fourth performance requirement which is a requirement on hardware performance of real machine.

It is to be noted that in the embodiment, each component may be implemented by dedicated software, or by executing a software program relevant to the component. Each component may be implemented by a program executor, such as a CPU or a processor, that reads and executes a software program recorded on a recording medium such as a hard disk or a semiconductor memory. Here, software that implements the information processing method, and the information processing system in the embodiment is the program as described below.

Specifically, the program causes a computer to execute an information processing method including: deciding a configuration of a machine learning model using a processor; performing first determination using the processor as to whether the machine learning model in the decided configuration meets a first performance requirement which is a requirement on hardware performance; when it is determined that the first performance requirement is met in the first determination, performing learning using the processor and the machine learning model in the configuration determined to meet the first performance requirement, performing second determination using the processor as to whether a learned model obtained by the learning meets a second performance requirement which is a requirement on evaluation value of output of a machine learning model, and when the learned model is determined to meet the second performance requirement in the second determination, outputting information using the processor, the information indicating that the first performance requirement and the second performance requirement are met; and when it is determined that the first performance requirement is not met in the first determination, changing the configuration of the machine learning model using the processor, and performing the first determination as to whether the machine learning model in the changed configuration meets the first performance requirement.

Although an information processing method and an information processing system according to one or more aspects of the present disclosure have been described based on the embodiment above, the present disclosure is not limited to the embodiment. The embodiment to which various modifications which will occur to those skilled in the art are made, and an embodiment constructed by a combination of components of different embodiments without departing from the spirit of the present disclosure are also included within the scope of the present disclosure.

The present disclosure is useful for an information processing method capable of efficiently deciding a machine learning model that meets requested hardware performance requirements.

What is claimed is:

1. An information processing method for determining compatibility of a remote computer for executing a machine learning model stored at a server, the method comprising:
acquiring, via a network and at the server having a processor, hardware information of the remote computer;
deciding, based on the hardware information of the remote computer, a configuration of the machine learning model stored at the server that is to be transmitted to and executed at the remote computer, using the processor, wherein the configuration of the machine learning model is capable of being modified to a different configuration in the server in accordance with the hardware information of the remote computer;
performing a first determination using the processor as to whether the machine learning model in the decided configuration meets a first performance requirement which is a requirement on hardware performance;
when it is determined that the first performance requirement is met in the first determination,
performing a machine learning processing using the processor and the machine learning model in the configuration determined to meet the first performance requirement,
performing a second determination using the processor as to whether a subsequent machine learned model obtained by the machine learning processing meets a second performance requirement which is a requirement on an evaluation value of an output of the machine learning model, and
when the subsequent machine learned model is determined to meet the second performance requirement in the second determination, outputting results information using the processor, the results information indicating that the first performance requirement and the second performance requirement are met; and
when it is determined that the first performance requirement is not met in the first determination,
changing, via the processor of the server and based on the hardware information of the remote computer, the configuration of the machine learning model to the different configuration that is capable of being performed at the remote computer, wherein the configuration of the machine learning model is changed by modifying a number of hierarchies or units included in the machine learning model, and
performing the first determination again as to whether the different configuration of the machine learning model meets the first performance requirement.

2. The information processing method according to claim 1,
wherein when it is determined that the second performance requirement is not met in the second determination, the machine learning processing is performed using a parameter different from a parameter used in the previously performed machine learning processing,
the second determination is performed as to whether a machine learned model obtained by the machine learning processing using the different parameter meets the second performance requirement,
when a number of determinations, in which it is determined that the second performance requirement is not met, is greater than or equal to a first number, the configuration of the machine learning model is changed, and
the first determination is performed as to whether the machine learning model in the changed configuration meets the first performance requirement.

3. The information processing method according to claim 1,
wherein a weight reduction processing is further performed on the subsequent machine learned model determined to meet the second performance requirement in the second determination,
third determination is performed as to whether a weight reduction model obtained by the weight reduction processing meets a third performance requirement, which is a requirement on hardware performance, and
when it is determined that the third performance requirement is met in the third determination, results information indicating that the third performance requirement is met is output.

4. The information processing method according to claim 3,
wherein a condition for the hardware performance specified in the third performance requirement is a condition for hardware performance that is different from a condition for the hardware performance specified in the first performance requirement.

5. The information processing method according to claim 3,
wherein when hardware performance of the weight reduction model determined not to meet the third performance requirement in the third determination meets a first condition, the weight reduction processing is performed using a parameter different from a parameter used in the previously performed weight reduction processing, and the third determination is performed as to whether a weight reduction model obtained by the weight reduction processing using the different parameter meets the third performance requirement.

6. The information processing method according to claim 3, wherein (i) when hardware performance of the weight reduction model determined not to meet the third performance requirement in the third determination does not meet the first condition, or (ii) when a number of determinations, in which it is determined that the third performance requirement is not met, is greater than or equal to a second number, the configuration of the machine learning model is changed, and the first determination is performed as to whether the machine learning model in the changed configuration meets the first performance requirement.

7. The information processing method according to claim 3, wherein a fourth determination is performed as to whether the weight reduction model determined to meet the third performance requirement in the third determination meets a fourth performance requirement, which is a requirement on hardware performance of a real machine, and when it is determined that the fourth performance requirement is met in the fourth determination, results information indicating that the fourth performance requirement is met is output.

8. The information processing method according to claim 7, wherein when the hardware performance of the weight reduction model determined not to meet the fourth performance requirement in the fourth determination meets a second condition, the weight reduction processing is performed using a parameter different from a parameter used in the previously performed weight reduction processing.

9. The information processing method according to claim 7, wherein (i) when the hardware performance of the weight reduction model determined not to meet the fourth performance requirement in the fourth determination does not meet the second condition, or (ii) when a number of determinations, in which it is determined that the fourth performance requirement is not met, is greater than or equal to a third number, the configuration of the machine learning model is changed, and the first determination is performed as to whether the machine learning model in the changed configuration meets the first performance requirement.

10. The information processing method according to claim 7, wherein a fifth determination is performed as to whether the weight reduction model determined to meet the fourth performance requirement in the fourth determination meets a fifth performance requirement, which is a requirement on an evaluation value of an output of a machine learning model, and when it is determined that the fifth performance requirement is met, results information indicating that the fifth performance requirement is met is output.

11. The information processing method according to claim 10, wherein when an evaluation value of the weight reduction model determined not to meet the fifth performance requirement in the fifth determination meets a third condition, the weight reduction processing is performed using a parameter different from a parameter used in the previously performed weight reduction processing.

12. The information processing method according to claim 10, wherein (i) when the evaluation value of the weight reduction model determined not to meet the fifth performance requirement in the fifth determination does not meet the third condition, or (ii) when a number of determinations, in which it is determined that the fifth performance requirement is not met, is greater than or equal to a fourth number, the configuration of the machine learning model is changed, and the first determination is performed as to whether the machine learning model in the changed configuration meets the first performance requirement.

13. An information processing system that stores a machine learning model and determines compatibility of a remote computer for executing the machine learning model, the information processing system comprising a processor, wherein the processor acquires, via a network, hardware information of the remote computer;

decides, based on the hardware information of the remote computer, a configuration of the machine learning model that is to be transmitted and executed at the remote computer, wherein the configuration of the machine learning model is capable of being modified to a different configuration in the information processing system in accordance with the hardware information of the remote computer;

performs a first determination as to whether the machine learning model in the decided configuration meets a first performance requirement which is a requirement on hardware performance;

when it is determined that the first performance requirement is met in the first determination, performs a machine learning processing using the machine learning model in the configuration determined to meet the first performance requirement, performs a second determination as to whether a subsequent machine learned model obtained by the machine learning processing meets a second performance requirement which is a requirement on an evaluation value of an output of the machine learning model, and when the subsequent machine learned model is determined to meet the second performance requirement in the second determination, outputs results information indicating that the first performance requirement and the second performance requirement are met; and when it is determined that the first performance requirement is not met in the first determination, changes, based on the hardware information of the remote computer, the configuration of the machine learning model to the different configuration that is capable of being performed at the remote computer, wherein the configuration of the machine learning model is changed by modifying a number of hierarchies or units included in the machine learning model, and performs the first determination again as to whether the different configuration of the machine learning model meets the first performance requirement.

\* \* \* \* \*